United States Patent
Shin (10) Patent No.: US 8,379,282 B2
(45) Date of Patent: Feb. 19, 2013

(54) LIGHT SCANNING UNIT AND METHOD OF DETECTING SCANNING SYNCHRONIZATION SIGNAL

(75) Inventor: Seong-Ho Shin, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 487 days.

(21) Appl. No.: 12/572,822

(22) Filed: Oct. 2, 2009

(65) Prior Publication Data

US 2010/0142018 A1   Jun. 10, 2010

(30) Foreign Application Priority Data

Dec. 4, 2008   (KR) .......................... 10-2008-0122392

(51) Int. Cl.
*G02B 26/08* (2006.01)

(52) U.S. Cl. ............... 359/199.3; 359/199.1; 359/200.7; 359/213.1; 359/214.1; 250/235

(58) Field of Classification Search .... 359/196.1–226.2; 250/234–236; 347/243, 259–260
See application file for complete search history.

(56) References Cited

U.S. PATENT DOCUMENTS

| 8,115,980 | B2 * | 2/2012 | Park ............................ 359/199.1 |
| 2008/0266628 | A1 * | 10/2008 | Brown et al. ................. 359/198 |
| 2010/0142020 | A1 * | 6/2010 | Kim ............................ 359/200.6 |

* cited by examiner

Primary Examiner — James Phan
(74) Attorney, Agent, or Firm — Stanzione & Kim, LLP (57) ABSTRACT

Disclosed are a light scanning unit and a method of synchronizing the scanning operation of such light scanning unit. The light scanning unit includes a deflection mirror that is driven to oscillate so as to deflect and scan a light beam in a bidirectional scanning path. The synchronization of a scanning operation may be made at least in part in consideration of the direction of flow of the current that is supplied to drive the deflection mirror to oscillate.

8 Claims, 7 Drawing Sheets

LIGHT SCANNING UNIT AND METHOD OF DETECTING SCANNING SYNCHRONIZATION SIGNAL

CROSS-REFERENCE TO RELATED PATENT APPLICATION

This application claims the benefit of Korean Patent Application No. 10-2008-0122392, filed on Dec. 4, 2008, in the Korean Intellectual Property Office, the disclosure of which is incorporated herein by reference in its entirety.

TECHNICAL FIELD

The present disclosure generally relates to a light scanning unit and a method of operating the same, and more particularly, to a light scanning unit capable of synchronizing a bidirectional scanning operation using a single photo-sensor, and a method of synchronizing the scanning operation of such light scanning unit.

BACKGROUND OF RELATED ART

Beam scanning technology, which is typically used to scan a beam of light produced by a light source on a predetermined area of an object to be light exposed or scanned, may have multiple applications. For example, beam scanning technology may be used in image forming apparatuses or in scanning type display devices. In image forming or printing applications, rotatable polygon mirrors are widely used in beam scanning. A polygon mirror, however, when rotated by a spindle motor, tends to vibrate and produce noise. Moreover, polygon mirrors are typically used in unidirectional scanning, which limits the scanning speed that may be achieved.

A scanning unit that may operate without a spindle motor and a polygon mirror may thus be desirable for a reduction in noise. Moreover, a scanning unit that is capable of bidirectional scanning by, for example, using a deflection mirror that vibrates in a sinusoidal fashion, may also be desirable for an increased scanning speed. However, in performing a bidirectional scanning, the scanning synchronization, that is, determining the starting time and/or the position for the scanning may become relatively more complicated. A typical light scanning unit includes a photo-sensor that detects the light beam, which detection is used for defining an effective scanning area and/or to determine the starting time for the scanning. The photo-sensor may be disposed in the vicinity of one or both ends of a scanning area. A light beam reflected from the deflection mirror may be received by the photo-sensor when it reaches an end of the scanning area at which the photo-sensor is positioned. The starting time for, the next scanning may be determined from the detection signal output by the photo-sensor. When unidirectional scanning is performed using a polygon mirror, it is generally easier to determine the starting time for scanning because there is only one scanning direction. However, when a light scanning unit capable of bidirectional scanning is used, the photo-sensor produces two output signals, one from each end, that themselves provides no indication of the scanning direction, thus necessitating a determination as to which of the two output signal is to be referenced in synchronizing the scanning in a particular scanning direction.

SUMMARY OF THE DISCLOSURE

According to an aspect of the present disclosure, there is provided a light scanning unit that may include a light source configured to produce light, a deflection mirror, a driver, a detection mirror, a photo-sensor and a controller. The deflection mirror may include a reflective surface. The deflection mirror may be positioned such that the light produced by the light source is incident upon the reflective surface. The driver may include an input through which to receive a driving current. The driver may be configured, in response to the received driving current, to drive the deflection mirror to oscillate such that the light incident upon the reflective surface of the deflection mirror is deflected bidirectionally across a scanned range. The detection mirror may be disposed in proximity to a first end of the scanned range, and may be configured to receive the deflected light from the deflection mirror, and to reflect the received deflected light toward a second end opposite the first end of the scanned range. The photo-sensor may be disposed in proximity to the second end of the scanning range, and may be configured to output a detection signal in response to receiving each of the deflected light from the deflection mirror and the reflected light from the detection mirror. The controller may be configured to synchronize a scanning operation based on the detection signal and an information associated with the driving current.

The light scanning unit may further comprise a detector coupled to the driver and configured to detect the information associated with the driving current.

The information associated with the driving current may comprise a direction of flow of the driving current.

The deflection mirror may be configured to oscillate about an axis substantially parallel to the reflective surface.

The driver may be configured to produce an electromagnetic force to drive the deflection mirror.

The driver may comprise a magnet, a yoke, a coil and a driving circuit. The magnet may be disposed on a bottom portion of the deflection mirror. The yoke may be disposed adjacent to the magnet, and may include a first portion and a second portion configured to collectively interact with the magnet to cause the magnet to move. The driving circuit may be coupled to the coil, and may be configured to supply the driving current to the coil.

The driving circuit may comprise an H-bridge circuit.

The deflection mirror may be configured to oscillate in such a manner that, when the deflection mirror rotates in a first direction, the light incident upon the reflective surface is scanned across the scanned range in a forward scanning direction, and such that the deflection mirror rotates in a second direction opposite the first direction, the light incident upon the reflective surface is scanned across the scanned range in a backward scanning direction opposite the forward scanning direction.

According to another aspect of the present disclosure, a method of synchronizing a scanning operation in a light scanning apparatus may comprise the steps of: supplying a drive current to drive a deflection mirror to rotate so as to cause a light beam incident upon the deflection mirror to be bidirectionally scanned; receiving from a photo-sensor a detection signal, the photo-sensor being configured to output the detection signal in response to a detection of light; and synchronizing the scanning operation based on both the received detection signal and an information relating the drive current.

The method may further comprise acquiring the information relating to the drive current, the information comprising a direction of flow of the drive current.

The step of synchronizing the scanning operation may comprise performing the scanning operation in response to receiving the detection signal immediately following the acquisition of the information relating to the drive current.

The step of receiving the detection signal may comprise receiving the detection signal output by the photo-sensor in response to one of the photo-sensor receiving a first light beam directly from the deflection mirror and the photo-sensor receiving a second light beam that was deflected by the deflection mirror and subsequently reflected by another mirror.

The performing of the scanning operation may comprise the steps of: starting a first scanning in a first scanning direction if the acquired information relating to the drive current indicates that the drive current flows in a first current flow direction; and starting a second scanning in a second scanning direction opposite the first scanning direction if the acquired information relating to the drive current indicates that the drive current flows in a second current flow direction opposite the first current flow direction.

A first detection signal output by the photo-sensor immediately following the acquisition of the information relating to the drive current that indicates that the drive current flows in a first current flow direction and a second direction signal that is a second one of consecutive ones of detection signals output by the photo-sensor immediately following the acquisition of the information relating to the drive current that indicates that the drive current flows in a second current flow direction opposite the first current flow direction may both be output by the photo-sensor in response to the photo-sensor receiving a deflected light beam directly from the deflection mirror.

A third detection signal that is a second one of consecutive detection signals output by the photo-sensor immediately following the acquisition of the information relating to the drive current that indicates that the drive current flows in the first current flow direction and a fourth detection signal that is output by the photo-sensor immediately after immediately following the acquisition of the information relating to the drive current that indicates that the drive current flows in the second current flow direction may both be output by the photo-sensor in response to the photo-sensor receiving a reflected light be that was deflected by the deflection mirror and subsequently reflected by another mirror.

The method may further comprise producing an electromagnetic force to drive the deflection mirror.

The step of producing the electromagnetic force may comprise providing a driver for driving the deflection mirror. The driver may comprise a magnet, a yoke, a coil and a driving circuit. The magnet may be disposed on a bottom portion of the deflection mirror. The yoke may be disposed adjacent to the magnet, and may include a first portion and a second portion configured to collectively interact with the magnet to cause the magnet to move. The driving circuit may be coupled to the coil, and may be configured to supply the driving current to the coil.

The driving circuit may comprise an H-bridge circuit.

The step of supplying the drive current may comprises the steps of supplying the drive current to flow in a first current flow direction so as to cause the deflection mirror to rotate in a first rotational direction to thereby scan the light beam incident upon the deflection mirror in a first scanning direction; and supplying the drive current to flow in a second current flow direction opposite the first current flow direction so as to cause the deflection mirror to rotate in a second rotational direction opposite to the first rotational direction to thereby scan the light beam incident upon the deflection mirror in a second scanning direction opposite the first scanning direction.

The method may further comprise determining whether the deflection mirror is oscillates at a predetermined resonance frequency.

According to yet another aspect, a light scanning apparatus may be provided to include a light source configured to produce a beam of light, a light deflector, a light detector and a controller. The light deflector may include a deflection mirror having a reflective surface upon which the light produced by the light source is incident. The light deflector may be configured to receive drive current, and, in response to the received drive current, to cause the deflection mirror to oscillate such that the light incident upon the reflective surface of the deflection mirror is deflected and scanned across a scanned path bidirectionally in first and second scanning directions. The light detector may be disposed in the scanning path so as to detect light beams deflected by the deflection mirror, and may be configured to produce a plurality of consecutive detection signals in response to detections of the light beams. The controller may be configured to select one of the plurality of consecutive detection signals for use as a reference signal in synchronizing a scanning operation based on a direction of flow of the drive current.

The light scanning apparatus may further comprise a detection mirror disposed in the scanning path spaced apart from the light detector. The detection mirror may be configured to receive the deflected light from the deflection mirror and to reflect the received deflected light toward the light detector.

The light detector may be configured to produce four consecutive detection signals during one oscillation period of the deflection mirror.

The controller may further be configured to determine the a direction of flow of the drive current, and to select a detection signal that is output by the light detector immediately following the determination of the direction of flow of the drive current.

The deflection mirror may oscillate about an axis that is substantially parallel to the reflective surface of the deflection mirror.

BRIEF DESCRIPTION OF THE DRAWINGS

Various features and advantages of the present disclosure will become more apparent by describing in detail several embodiments thereof with reference to the attached drawings, in which.

DETAILED DESCRIPTION OF SEVERAL EMBODIMENTS

Hereinafter, the present disclosure will be described more fully with reference to the accompanying drawings, in which several embodiments of the disclosure are shown.

Figure 1:
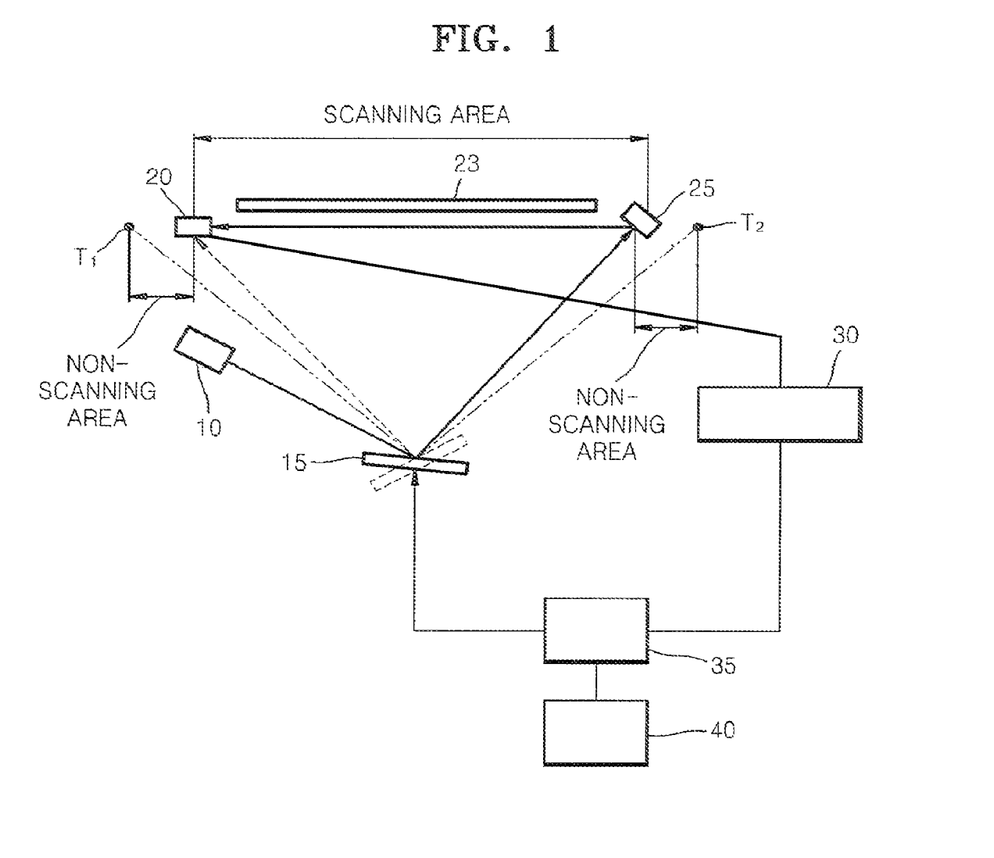
FIG. 1 is a diagram schematically illustrating a light scanning unit according to an embodiment of the present disclosure.

FIG. 1 is a diagram schematically illustrating a light scanning unit according to an embodiment of the present disclosure.

The light scanning unit may include a light source 10 and a deflection mirror 15 configured to deflect a beam produced by the light source 10 onto a light exposure surface or along the optical path to the light exposure surface. The deflection mirror 15 may perform bidirectional scanning on the light exposure surface via vibration (e.g., rotational or pivotal oscillating) motion. The deflection mirror 15 may be vibrated by a driver 35. A controller 30 may be configured to control the operation of the driver 35 so as to control the vibration frequency and/or the amplitude of the vibration of the deflection mirror 15. The controller 30 may include hardware (e.g., processor, memory, input/output interfaces) and/or software (e.g., operating system, firmware, drivers, applications) to control the driver 35. The driver 35 may drive the deflection mirror 15 by using, for example, an electromagnetic force. The light scanning unit may further include an image forming optical device 23, which may be configured to form an image from the beam reflected at the deflection mirror 15 onto the light exposure surface.

The light scanning unit may include a photo-sensor 20 to detect a scanning synchronization (sync) signal, that is, a signal that may be used for scanning synchronization. For example, the photo-sensor 20 may be disposed at one side or end of an area on which the beam is scanned by the deflection mirror 15, and a mirror 25 may be disposed at the opposite side or end of that area. The photo-sensor 20 may be configured to receive the light beam from the deflection mirror 15 or from the mirror 25, and may output an electrical signal in response to the received light beam. The mirror 25 may be configured to reflect or direct a light beam received from the deflection mirror 15 to the photo-sensor 20.

The photo-sensor 20 may be used to detect a starting time for scanning. For example, when the photo-sensor 20 detects a light beam, the timing information associated with the detection may be used to perform the data scanning. In a light scanning unit that is configured to perform unidirectional scanning, detecting a scanning sync signal may easily be done because the direction of the scanning may be presumed. When, however, the light scanning unit is configured to perform bidirectional scanning, the output signals produced by the photo-sensor 20 alone may not provide an indication of the scanning direction.

When the deflection mirror 15 is used to perform a bidirectional scanning, the points T1 and T2 illustrated in FIG. 1 represents the turning points at which the deflection mirror 15 changes the direction of rotation. Referring to FIG. 1, as the deflection mirror 15 rotates in a clockwise direction, the light beam produced by the light source 10 is scanned from T1 to T2. On the other hand, as the deflection mirror 15 rotates in a counterclockwise direction, the light beam produced by the light source 10 is scanned from T2 to T1. Hereinafter, the area between the photo-sensor 20 and the mirror 25 is referred to as a scanning area, and the areas between the photo-sensor 20 and T1 and between the mirror 25 and T2 are referred to as non-scanning areas.

Figure 2:
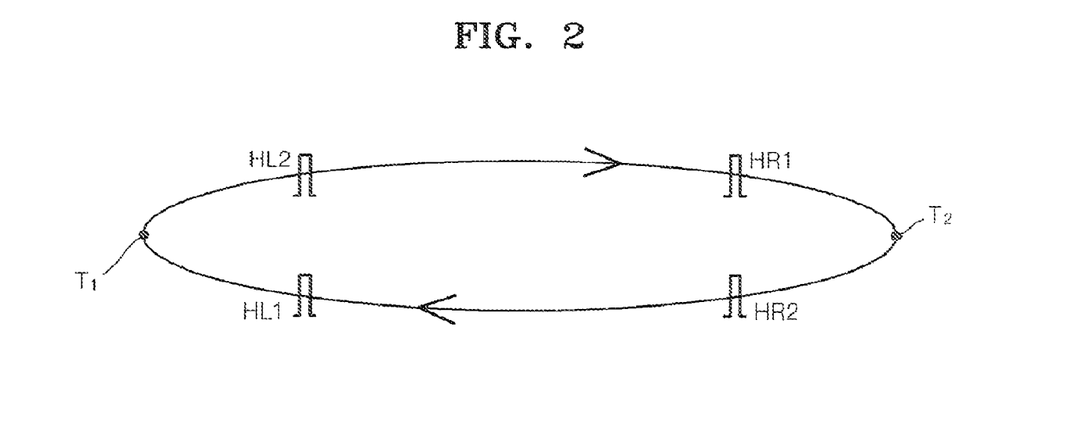
FIG. 2 is a diagram of output signals from a photo-sensor of a light scanning unit according to an embodiment of the present disclosure.

Referring to FIG. 2, the output signals produced by the photo-sensor 20 in response to the detection of the light beam produced by the light source 10 may include a first signal HL1, a second signal HL2, a third signal HR1 and a fourth signal HR2. When a photo-sensor 20 is disposed at each end of the scanning area, two output signals may be generated when the light beam is at each end of the scanning area. For example, a photo-sensor 20 on the left end of the scanning area according to FIG. 1 produces the first signal HL1 and the second signal HL2 while a photo-sensor 20 on the right end of the scanning area produces the third signal HR1 and the fourth signal HR2. In such configuration, because the photo-sensors 20 are provided on both ends as separate and distinct devices, it may be easier to classify an output signal as being from the photo-sensor 20 at one end of the scanning area or from the photo-sensor 20 at the other end of the scanning area. When two photo-sensors 20 are used in the light scanning unit, a scanning sync signal may be detected based on, the second output signal of each of the photo-sensors 20 when signals are generated according to the diagram shown in FIG. 2.

However, when a single photo-sensor 20 is used to detect a scanning sync signal, a determination may need to be made as to which one of the first signal HL1, the second signal HL2, the third signal HR1 and the fourth signal HR2 is to be used as the reference signal for the start of a scanning. Referring back to FIG. 1, the light scanning unit may further include a detector 40 coupled to the driver 35. The detector 40 may be configured to detect a current supplied to the driver 35 for driving the deflection mirror 15. By detecting the current supplied to the driver 35, the determination as to which output signal to use as the scanning sync signal may be made. In FIG. 2, T1 and T2 correspond to the turning points T1 and T2 shown in FIG. 1 at which the deflection mirror 15 changes its rotational direction. The times at which T1 and T2 occur correspond to the times at which the current supplied to the driver 35 to vibrate the deflection mirror 15 changes its direction of flow.

Figure 3:
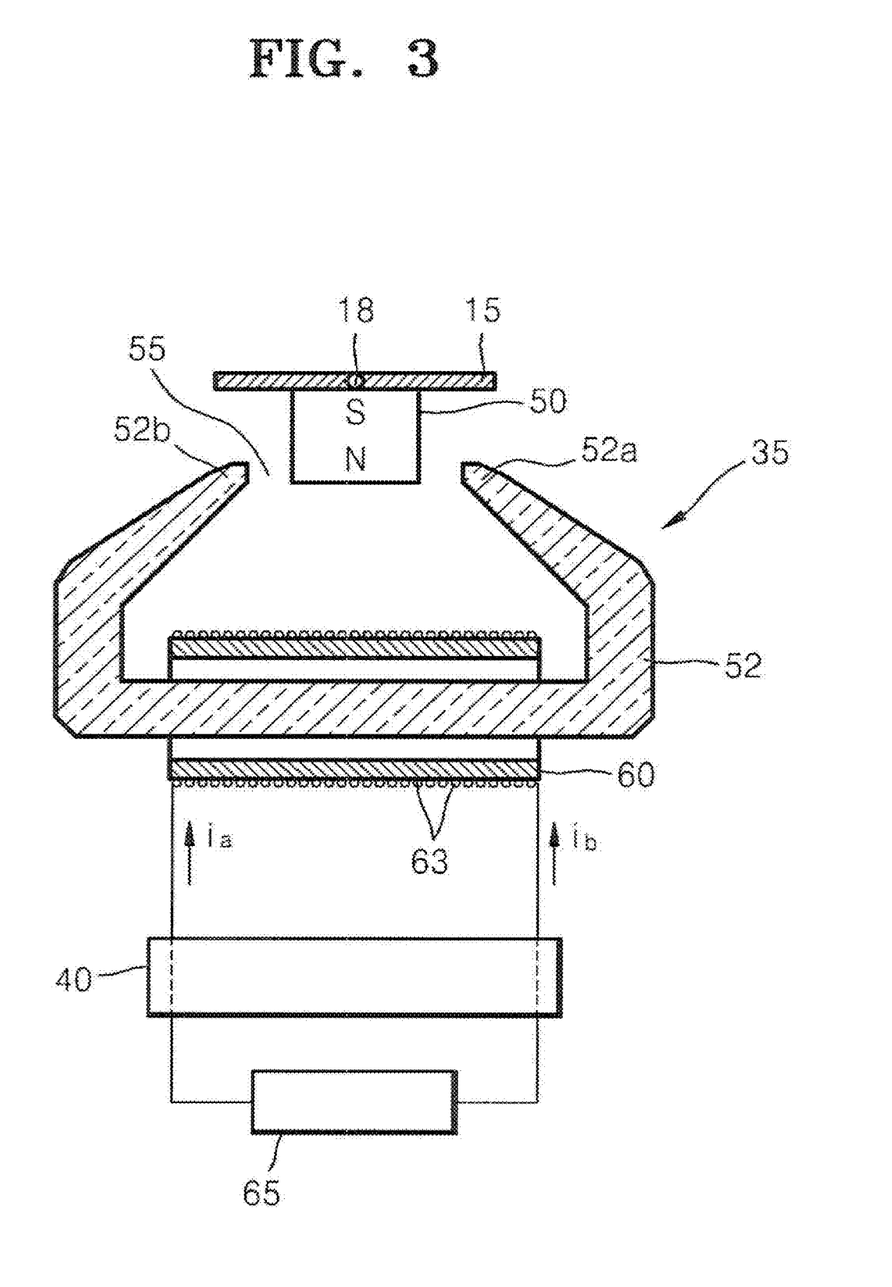
FIG. 3 is a diagram of a driver of a light scanning unit according to an embodiment of the present disclosure.

FIG. 3 is a diagram of the driver 35 according to an embodiment for driving the deflection mirror 15. The driver 35 may include a magnet 50, which may be disposed on the bottom surface of the deflection mirror 15, a yoke 52, which may be disposed below the magnet 50, and a coil 63, which is wound around the yoke 52. The yoke 52 may include a first portion 52a and a second portion 52b, which may be disposed to opposingly face each with a gap 55 therebetween. The coil 63 may be wound around an outer portion of a bobbin 60 that may be disposed about a circumference of the yoke 52. When a current is supplied to the coil 63, the yoke 52 may operate as an electromagnet, and the polarity of the first portion 52a and of the second portion 52b depends on the direction in which the current is supplied. For example, the first portion 52a and the second portion 52b may behave as a north pole and a south pole of an electromagnet, respectively, when the current flowing through the coil 63 flows in one direction. When the current flowing through the coil 63 flows in the opposite direction, the polarities of the first portion 52a and the second portion 52b may be reversed. Moreover, the first portion 52a and the second portion 52b may be disposed adjacent to the magnet 50 so as to mutually operate with the magnet 50 to vibrate or oscillate the deflection mirror 15. The driver 35 may include a driving circuit unit 65 configured to supply current to the coil 63. In some embodiments, the detector 40, which may be configured to detect information about the current supplied to the coil 63 from the driving circuit unit 65, may be combined or integrated with the driving circuit unit

65. The information detected by the detector 40 may include, for example, the direction of the current supplied to the coil 63.

Figure 4A:
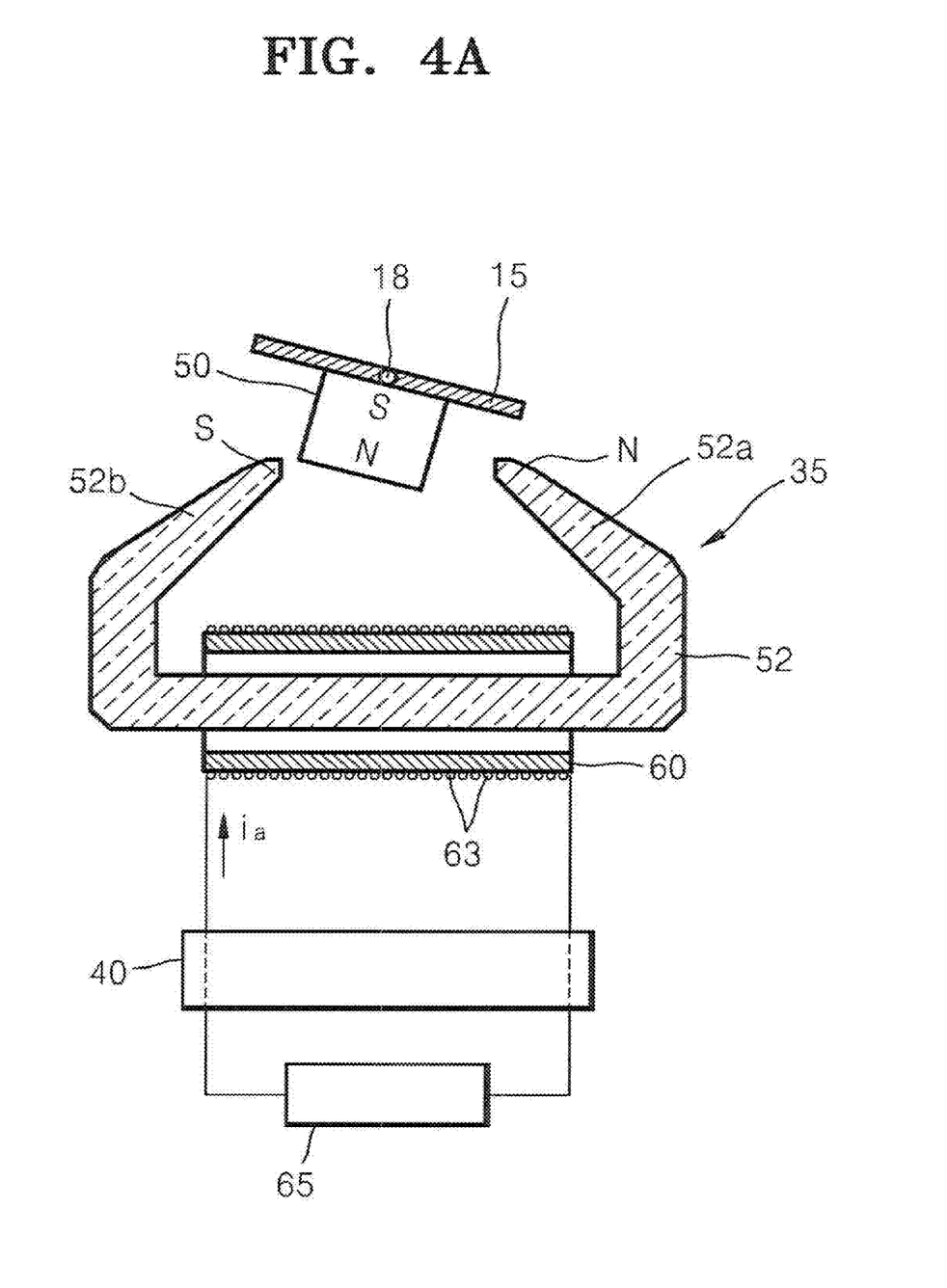
FIGS. 4A and 4B are diagrams that describe operations of a light scanning unit, according to embodiments of the present disclosure.
Figure 4B:
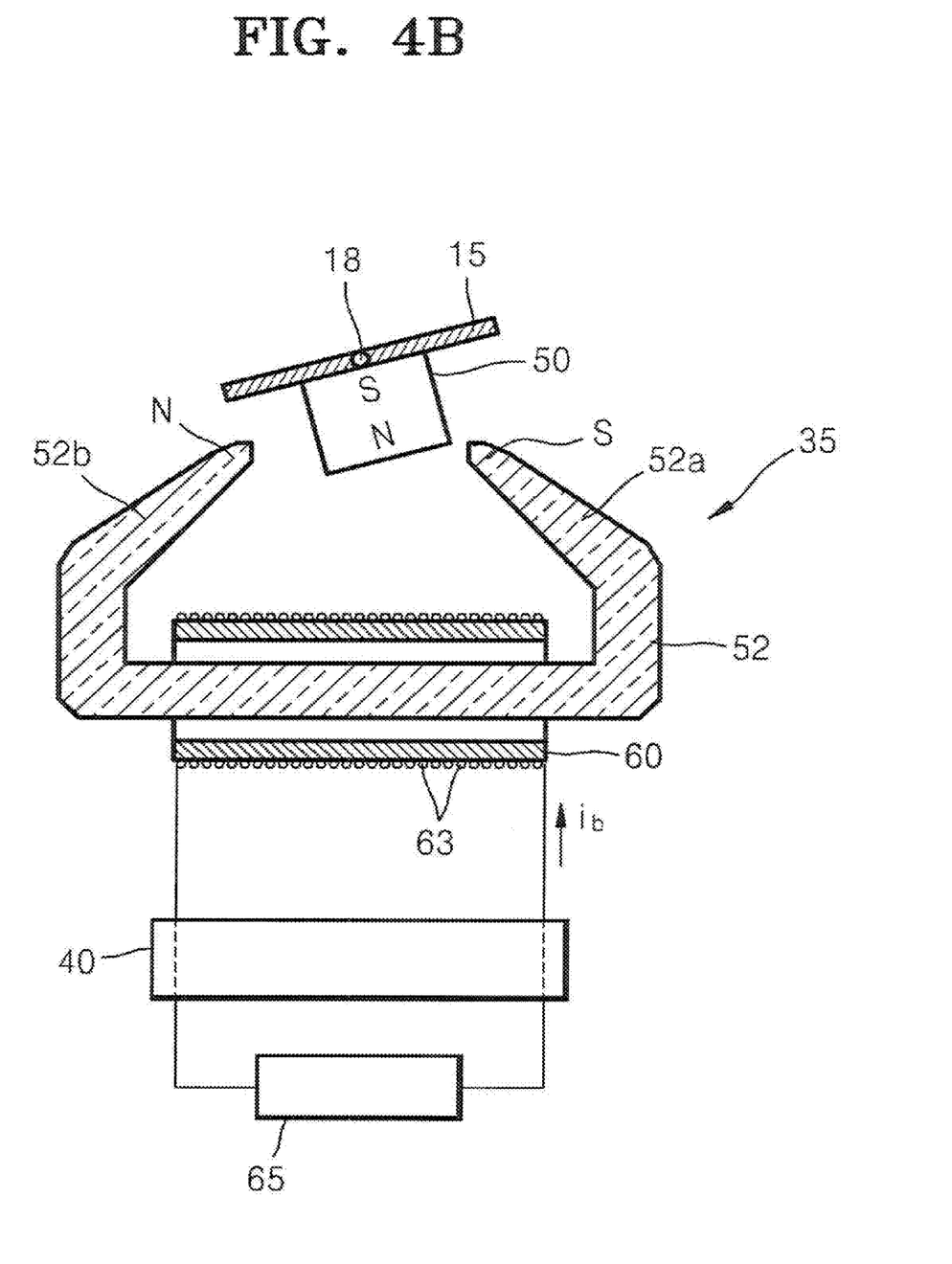
Figure 5:
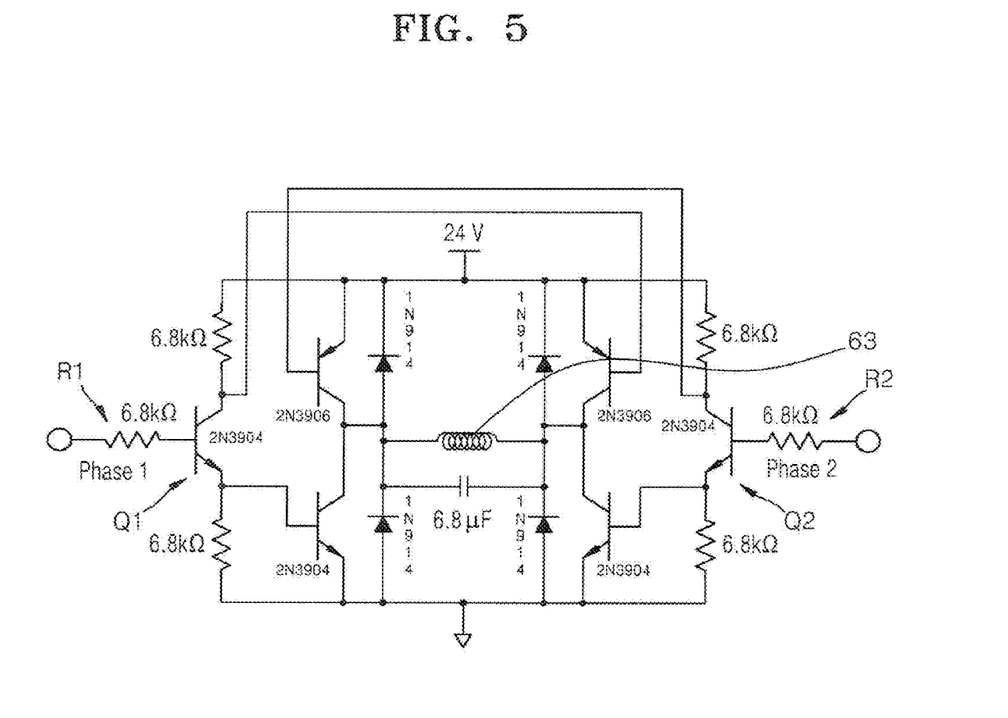
FIG. 5 is a diagram illustrating an example of an H-bridge circuit used in a driver of a light scanning unit, according to an embodiment of the present disclosure.

The vibration motion of the deflection mirror 15 is described below with reference to FIGS. 4A and 4B. FIG. 4A illustrates an operation of the deflection mirror 15 when the current flows through the coil 63 in a direction $i_a$. When the current is supplied to the coil 63 in the direction $i_a$, an electromagnetic force is generated between the yoke 52 and the magnet 50. In this example, the first portion 52a and the second part 52b may behave as a north pole and a south pole of an electromagnet, respectively. When an upper portion of the magnet 50 behaves as a south pole of the magnet 50 and a bottom portion of the magnet 50 behaves as a north pole of the magnet 50, a repulsive force may be acting between the first portion 52a of the yoke 52 and the north pole of the magnet 50, and an attractive force may be acting between the second portion 52b of the yoke 52 and the north pole of the magnet 50. As a result of such forces, the deflection mirror 15 may rotate in a clockwise direction about a torsion bar 18 as the rotational axis. Referring to FIG. 4B, when the current flows through the coil 63 in the direction $i_b$, which is the opposite direction to the direction $i_a$, the first portion 52a and the second portion 52b may behave as a south pole and a north pole of an electromagnet, respectively. In this example, an attractive force exists between the first portion 52a of the yoke 52 and the north pole of the magnet 50, and a repulsive force exists between the second portion 52b of the yoke 52 and the south pole of the magnet 50. Such forces result in a counter-clockwise rotation of the deflection mirror 15. By changing the direction in which the current is supplied to the coli 63, the deflection mirror 15 may vibrate as a sine wave, that is, in a sinusoidal manner. The driving circuit unit 65 may be made using an H-bridge circuit to supply an alternating current (AC) to the coil 63. FIG. 5 illustrates an example of an H-bridge circuit, however, supplying of an AC to the coil 63 may be achieved using various other circuits known in the art, and the driving circuit unit 65 thus need not be limited to an H-bridge circuit. Further, in other embodiments, the components of the H-bridge circuit and/or the value of such components may be different from those shown in FIG. 5.

The rotational direction of the deflection mirror 15 may change according to the direction of the current supplied to the coil 63 of the driving circuit unit 65. As a result, the scanning direction may change according, to the direction of the current supplied to the coil 63. For example, a forward scanning may be performed when the direction of the current is the direction $i_a$ while a backward scanning may be performed when the direction of the current is the direction $i_b$. Accordingly, the scanning sync signal may be determined in consideration of the direction in which the current flows through the driver 35.

Figure 6:
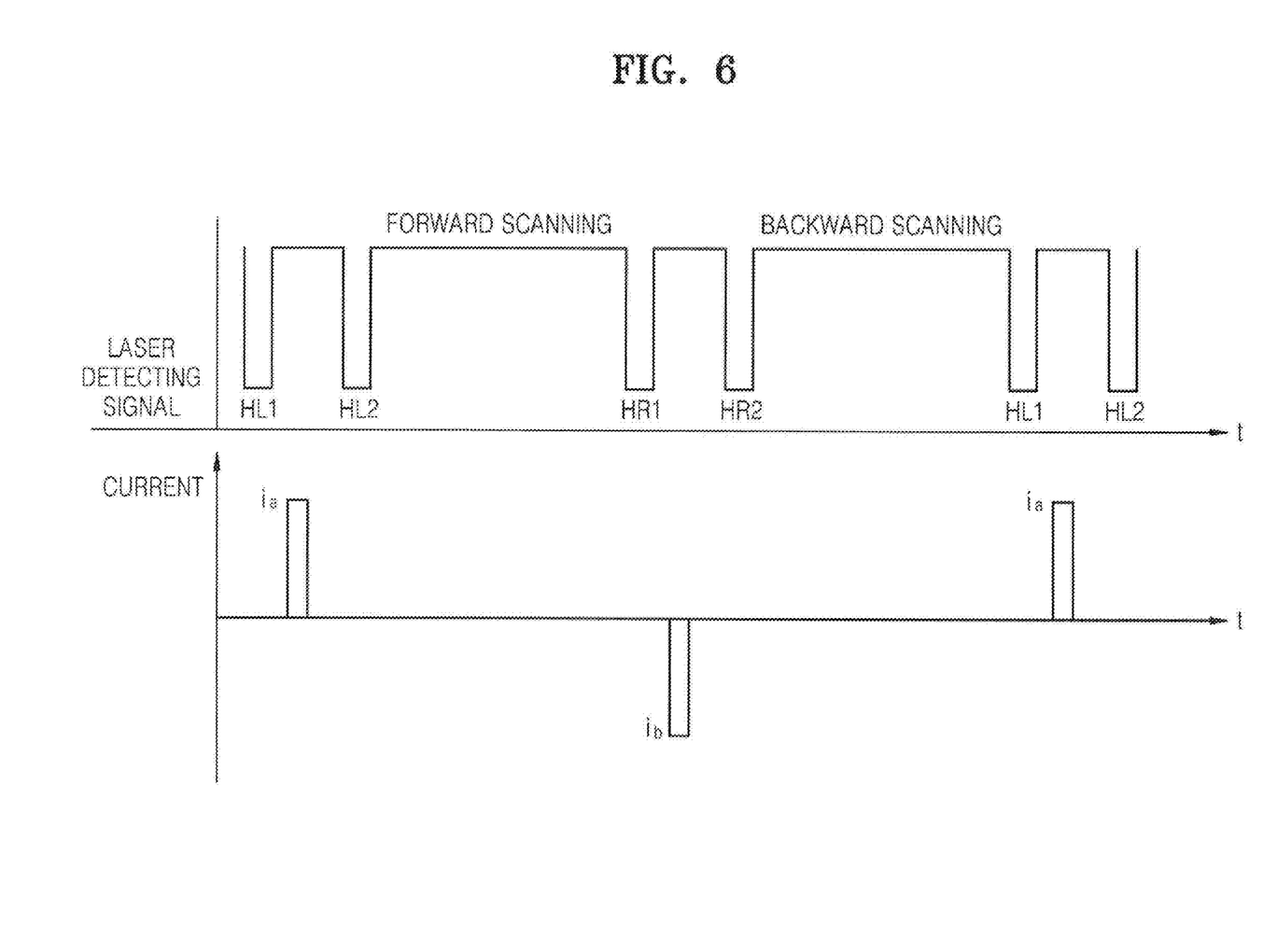
FIG. 6 is a diagram illustrative of a relationship between a laser detection signal output from a photo-sensor of a light scanning unit and a direction of a current supplied to a driver, according to an embodiment of the present disclosure.

FIG. 6 is a diagram that illustrates an example of the relationships between the current supplied to the coil 63 and the detection output signal from the photo-sensor 20. For example, when the current is supplied to the coil 63 in the direction $i_a$, the deflection mirror 15 may rotate clockwise as shown in FIG. 4A. Clockwise rotation may correspond to scanning the light from the light source 10 in the direction from the left end of the scanning area (i.e., from T1) to the right end of the scanning area (i.e., to T2) as shown in FIG. 1. In this example, the photo-sensor 20 at the left end of the scanning area may produce the second signal HL2 (see FIG. 2) in response to the detection of the light beam when the light beam is scanned and passes through the position where the photo-sensor 20 is located. When the light beam passes the position of the mirror 25 (i.e., at the right end of the scanning area), the mirror 25 may receive the light beam and reflect the received light beam toward the photo-sensor 20, which may produce the third signal HR1 in response to detecting the beam. Next, when the direction of the current supplied to the coil 63 is reversed to the direction $i_b$, the direction of the light beam is changed at T2 to the direction of returning to the left end of the scanning area (i.e., towards T1). When the light beam is so scanned in the reverse direction and passes through the position where the mirror 25 is located, the mirror 25 may reflect the light beam to the photo-sensor 20, which may output the fourth signal HR2 in response to detecting the light beam received from the mirror 25. As the scanning continues in the reverse direction, the beam passes through the position of the photo-sensor 20, causing the photo-sensor 20 to output the first signal HL1 in response to the detection of the light beam. When the direction of the current is subsequently changed from the direction $i_b$ to the direction $i_a$, the scanning direction of the beam is changed at T1 and, as described above, the second signal HL2, the third signal HR1, the fourth signal HR2, and the first signal HL1 are repeatedly output by the photo-sensor 20. As way of a summary, the example of an operation pattern associated with the light scanning unit illustrated in FIG. 6 includes: (a) the current is set to flow in the direction $i_a$ at T1; (b) the second signal HL2 is output by the photo-sensor 20 from direct detection of the scanned light beam; (c) forward scanning starts; (d) the third signal HR1 is output by the photo-sensor 20 from detection of the scanned beam reflected from mirror 25; (e) the current is set to flow in the direction $i_b$ at T2; (f) the fourth signal HR2 is output by the photo-sensor 20 from detection of the scanned light beam reflected from mirror 25; (g) backward scanning starts; (h) the first signal HL1 is output by the photo-sensor 20 from direct detection of the scanned beam; and (i) the current is set to flow in the direction $i_a$ at T1. Referring to the above-described pattern, the scanning sync signal may be detected or determined according to the direction of the current flowing through the coil 63. In other words, after detecting a change in the direction of the current flowing through the coil 63, one of the output signals from the photo-sensor 20 may be associated with a signal to start either forward scanning or backward scanning. Whether forward or backward scanning is to be performed depends on the whether the change in current flow was from direction $i_a$ to direction $i_b$ or from direction $i_b$ to direction $i_a$, that is whether the current flow in the direction $i_a$ or in the direction $i_b$.

Figure 7:
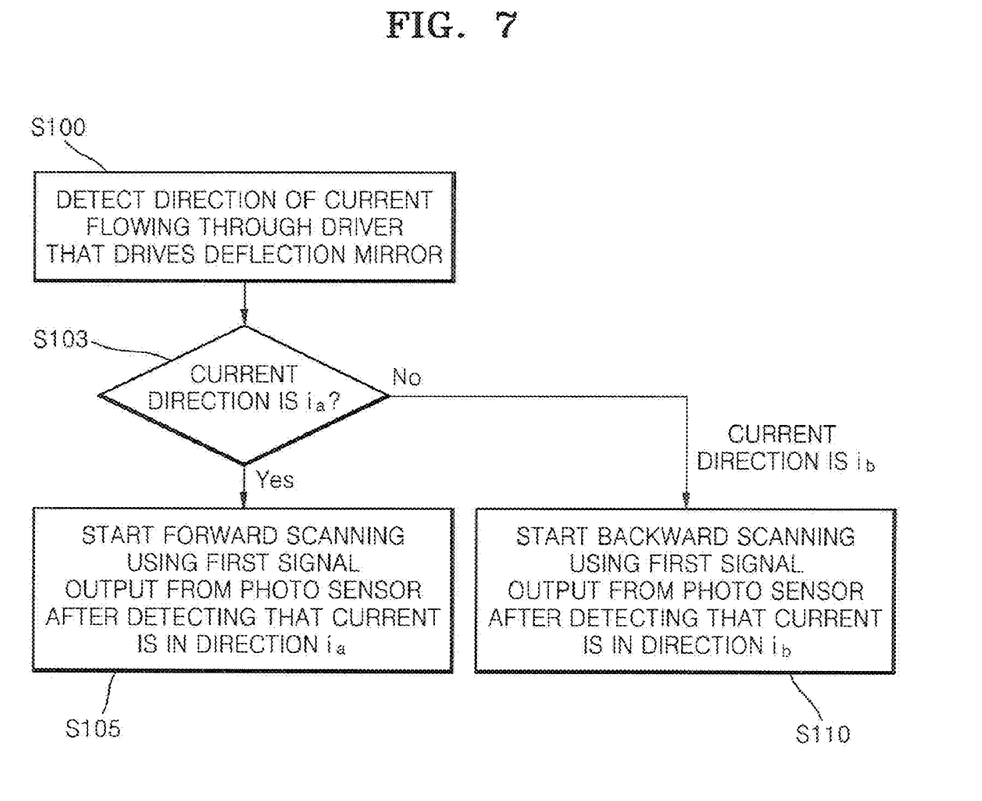
FIG. 7 is a flowchart illustrating a method of detecting a scanning synchronization (sync) signal, wherein the method is performed in a light scanning unit, according to an embodiment of the present disclosure.

A method of detecting a scanning sync signal, according to an embodiment of the present disclosure, is described below with reference to FIG. 7. The method may be performed in the light scanning unit described above with respect to FIGS. 1 and 3, which are configured to perform scanning by detecting a scanning sync signal or a signal that may be used for scanning synchronization. At S100, information about a current flowing through the driver 35 that drives the deflection mirror 15 may be obtained. The information may include the direction of the current flowing through the driver 35. The detector 40 may detect the information in any of various ways. For example, a resistor may be disposed between the driving circuit unit 65 and the coil 63, and the direction of the current may be detected by measuring the voltage (Vs) across the resistor. In other words, the voltage Vs may have one polarity when the current flows in, the direction $i_a$ and a different polarity when the current flows in the direction $i_b$. For example, the voltage Vs may be a positive voltage (e.g., +Vs) when the current flows in the direction $i_a$, and the voltage Vs may be a negative voltage (e.g., −Vs) when the current flows in the direction $i_b$. By measuring the voltage Vs, the direction of the current flowing in the current 63 may be determined.

Alternatively, the direction of the current flowing through the driver 35 may be determined by outputting an ON-OFF signal or a positive/negative (i.e., +/−) signal by using an operational amplifier or a transistor. For example, the direction of a current flowing through the coil 63 of the driver 35 when a transistor (e.g., Q1) associated with Phase 1 in the H-bridge of FIG. 5 is turned ON is opposite to the direction of the current flowing through the coil 63 when a transistor (e.g., Q2) associated with Phase 2 in the H-bridge is turned ON. Thus, the direction of the current flowing through the coil 63 may be determined by detecting operational states of the transistors associated with Phase 1 and Phase 2 in the H-bridge. The direction of the current flowing through the coil 63 may also be determined by measuring the voltage at a base resistor (e.g. R1) of the transistor of. Phase 1 and/or the voltage at a base resistor (e.g., R2) of the transistor of Phase 2. Using a similar approach, the direction of the current may be determined by detecting operational states of other transistors forming an H-bridge circuit, and such a method of determining the operational states of transistors of an H-bridge circuit is well known to one of ordinary skill in the art. The methods of detecting information about the current flowing through the coil 63 need not be limited to the above described examples, and may vary depending on the configurations of the drive circuit.

When the detector 40 detects that the current is flowing in the direction $i_a$ at S103, forward scanning according to the corresponding image signals may start at S105 in reference to the first signal output produced by the photo-sensor 20 after the detection of the direction of the current. In this example, forward scanning may be performed when the current is flowing in the direction $i_a$, and backward scanning may be performed when the current is flowing in the direction $i_b$. Otherwise, when the detector 40 detects that the current is flowing in the direction $i_b$ at S103, backward scanning according to the corresponding image signals may start at S110 in reference to the first signal output produced by the photo-sensor 20 after detection of the direction of the current.

When the current is supplied to the coil 63 from the driver 35, a preparatory or preliminary operation may be needed until the deflection mirror 15 is sufficiently stable to vibrate or oscillate at an intended resonance frequency. During the preparatory operation, the amplitude of the rotation of the deflection mirror 15 may be small, and the light beam reflected by the deflection mirror 15 may not be reflected at a sufficient angle to reach the photo-sensor 20. Thus, according to an embodiment, a determination of whether the deflection mirror 15 vibrates in a reference resonance frequency may additionally be made. Also, when the deflection mirror 15 vibrates at the intended resonance frequency, the photo-sensor 20 may detect the beam produced by the light source 10, and produce a detection signal. When the light beam is not detected by the photo-sensor 20, that is, when the photo-sensor 20 does not produce a detection signal within a predetermined time, even when current has been supplied to the coil 63 to rotate the deflection mirror 15, the light scanning unit may be malfunctioning, and thus the detecting of a scanning sync signal may be delayed until such time when a detecting signal is normally output.

Thus, in the light scanning unit associated with the above-described embodiments, the deflection mirror 15 may vibrate in a sinusoidal manner by using an electromagnetic force produced by the driver 35, the direction of the current supplied to the driver 35 may be determined, and may be a basis of determining the proper one of the output signals produced by the photo-sensor 20 for use in scanning synchronization. Accordingly, when the light scanning unit using a single photo-sensor 20 is configured to perform bidirectional scanning, the scanning sync signal may be determined by detecting the direction of the current supplied to the driver 35. The controller 30 may control the starting time for scanning by using information about the current detected by the detector 40. In some embodiments, the controller 30 may be configured to determine which one of the output signals produced by the photo-sensor 20 is associated with the start of forward scanning and/or with the start of backward scanning based on the information about the current detected by the detector 40. According to an alternative embodiment, the controller 30 may also control the supply of the current to the driver 35, and may thus be aware of the information regarding the supplied current, including the direction of the flow of the current. In such an embodiment, a separate detection of the direction of the current may not be necessary.

According to an aspect of the present disclosure, a light scanning unit, which vibrates a deflection mirror in a sinusoidal manner by using an electromagnetic force, may detect a scanning sync signal based on information about the current supplied to the driver that drives the deflection mirror. Accordingly, a light scanning unit configured to perform bidirectional scanning may detect the scanning sync signal by using a single photo-sensor, thus allowing a reduction in the manufacturing costs of the light scanning unit.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A light scanning unit, comprising:
 a light source configured to produce light;
 a deflection mirror having a reflective surface, the deflection mirror being positioned such that the light produced by the light source is incident upon the reflective surface;
 a driver having an input through which to receive a driving current, the driver being configured, in response to the received driving current, to drive the deflection mirror to oscillate such that the light incident upon the reflective surface of the deflection mirror is deflected bidirectionally across a scanned range;
 a detection mirror disposed in proximity to a first end of the scanned range, the detection mirror being configured to receive the deflected light from the deflection mirror and to reflect the received deflected light toward a second end opposite the first end of the scanned range;
 a photo-sensor disposed in proximity to the second end of the scanning range, the photo-sensor being configured to output a detection signal in response to receiving each of the deflected light from the deflection mirror and the reflected light from the detection mirror; and
 a controller configured to synchronize a scanning operation based on the detection signal and an information associated with the driving current.

2. The light scanning unit of claim 1, further comprising:
 a detector coupled to the driver and configured to detect the information associated with the driving current.

3. The light scanning unit of claim 1, wherein the information associated with the driving current comprises a direction of flow of the driving current.

4. The light scanning unit of claim 1, wherein the deflection mirror is configured to oscillate about an axis substantially parallel to the reflective surface.

5. The light scanning unit of claim 1, wherein the driver is configured to produce an electromagnetic force to drive the deflection mirror.

6. The light scanning unit of claim 5, wherein the driver comprises:
- a magnet disposed on a bottom portion of the deflection mirror;
- a yoke disposed adjacent to the magnet, the yoke having a first portion and a second portion configured to collectively interact with the magnet to cause the magnet to move;
- a coil wound around the yoke; and
- a driving circuit coupled to the coil and configured to supply the driving current to the coil.

7. The light scanning unit of claim 6, wherein the driving circuit includes an H-bridge circuit.

8. The light scanning unit of claim 1, wherein the deflection mirror is configured to oscillate in such a manner that, when the deflection mirror rotates in a first direction, the light incident upon the reflective surface is scanned across the scanned range in a forward scanning direction, and, the deflection mirror rotates in a second direction opposite the first direction, the light incident upon the reflective surface is scanned across the scanned range in a backward scanning direction opposite the forward scanning direction.

* * * * *